United States Patent [19]

Marcus

[11] 4,065,246

[45] Dec. 27, 1977

[54] INJECTION BLOW MOLDING APPARATUS

[76] Inventor: Paul Marcus, 85 Pascack Road, Pearl River, N.Y. 10965

[21] Appl. No.: 707,087

[22] Filed: July 20, 1976

Related U.S. Application Data

[60] Continuation of Ser. No. 551,274, Feb. 20, 1975, abandoned, and a continuation-in-part of Ser. No. 558,819, March 16, 1975, Pat. No. 3,990,826, which is a continuation of Ser. No. 318,703, Dec. 27, 1973, abandoned, which is a division of Ser. No. 158,161, June 30, 1971, Pat. No. 3,776,991.

[51] Int. Cl.$^2$ ............................................. B29D 23/03
[52] U.S. Cl. ..................................... 425/528; 425/533; 425/534
[58] Field of Search ................. 425/242 B, DIG. 209, 425/DIG. 213, DIG. 216, 528, 533, 534

[56] References Cited

U.S. PATENT DOCUMENTS

| | | | |
|---|---|---|---|
| 3,944,643 | 3/1976 | Sato et al. | 425/DIG. 209 |
| 3,966,378 | 6/1976 | Valyi | 425/242 B |

Primary Examiner—Richard B. Lazarus
Attorney, Agent, or Firm—Kane, Dalsimer, Kane, Sullivan and Kurucz

[57] ABSTRACT

In an injection blow molding process for making plastic receptacles, an injection station is provided for injection molding a parison of selected configuration. An expansion and blowing station follows for initially expanding the parison to a predetermined length, and thereafter the parison is blow molded into a predetermined lateral and final configuration to thereby biaxially orient the molecular structure of the parison. An ejection station is provided for removing the finished product from the apparatus. The parison is transferred along a first path away from the injection station, along a second path which is normal to the first path and then along a third path parallel to the first path to the expansion and blowing station. At the same time, a finished product is transferred from the blowing station to the ejection station along a corresponding path. The blow molding station is adjustable or interchangeable so that different size containers can be molded without changing the size of the injection cavity. The apparatus may also be designed with a core pin arrangement to insert a liner within an outer plastic parison shell prior to the blow molding process at which time the liner and parison shell will weld together to form a finished container. Close temperature control is provided with the parison being maintained with a desired temperature range to retain the biaxial orientation. Finally, the apparatus is designed to facilitate removal of the finished product to further work stations for subsequent work thereon.

35 Claims, 12 Drawing Figures

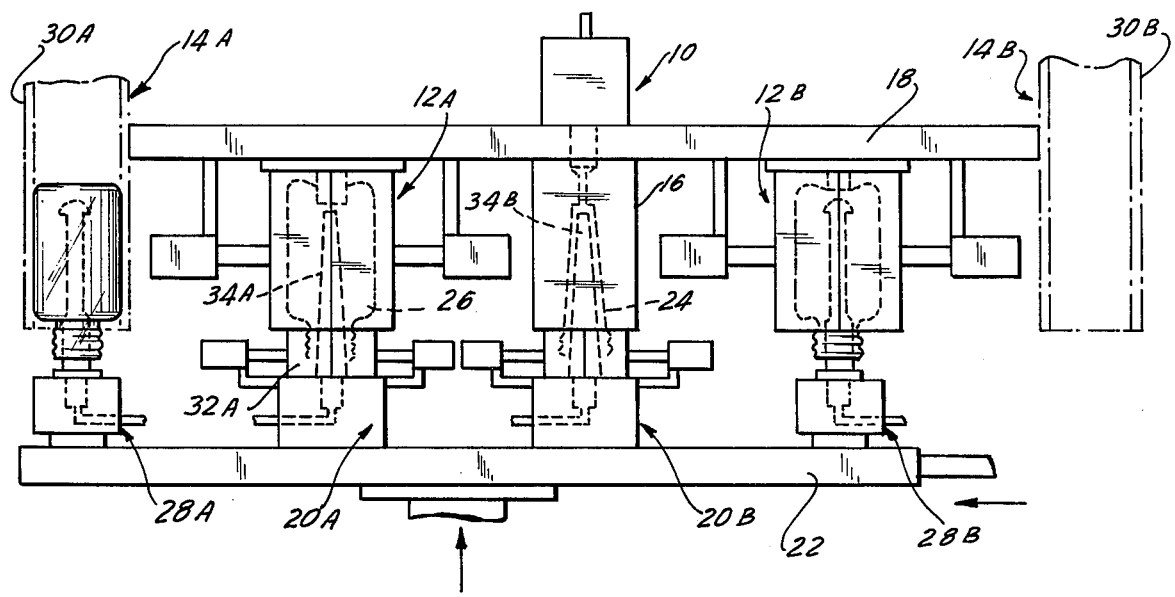
FIG.1
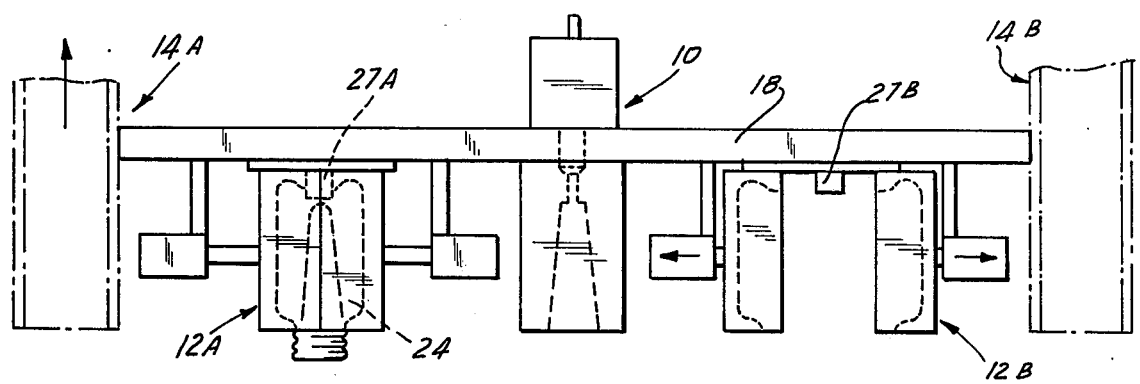
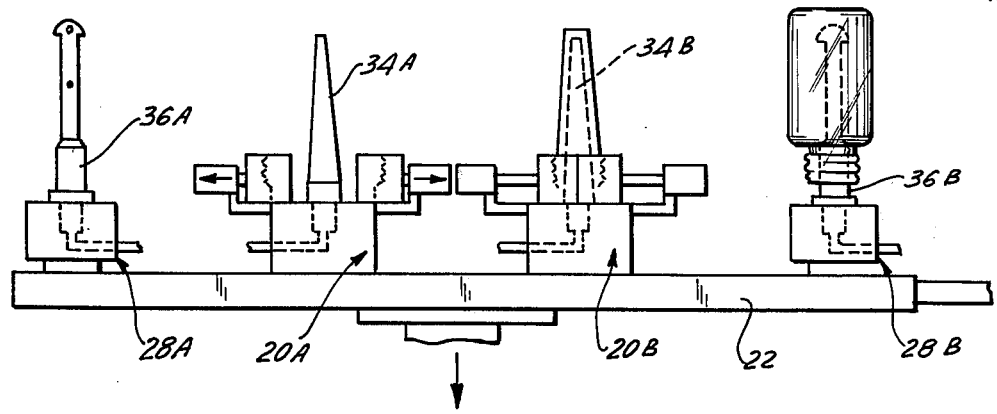
FIG.2

FIG. 3
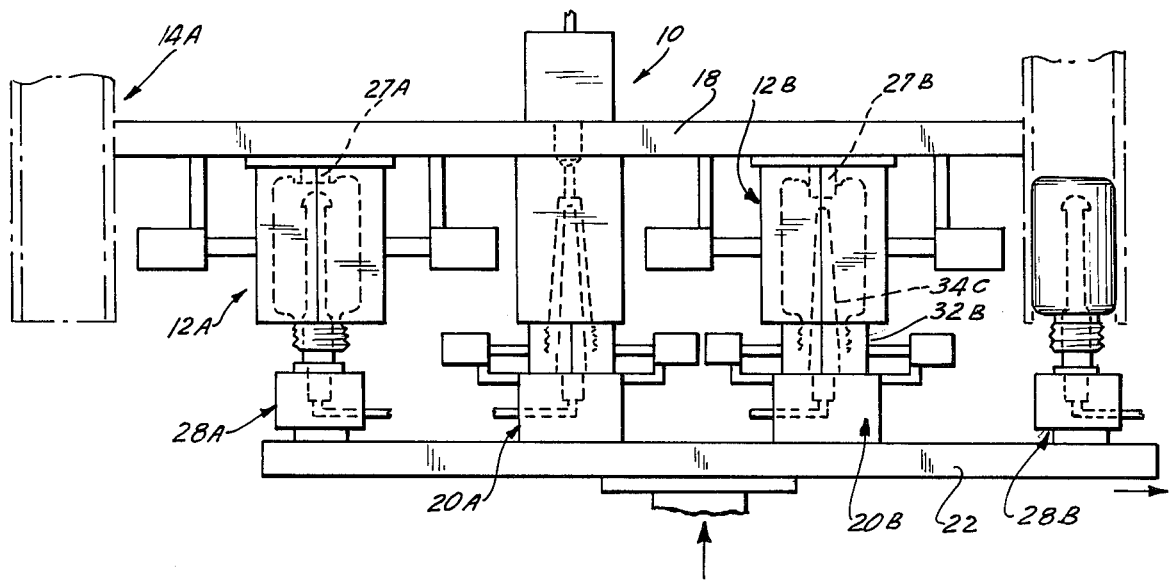
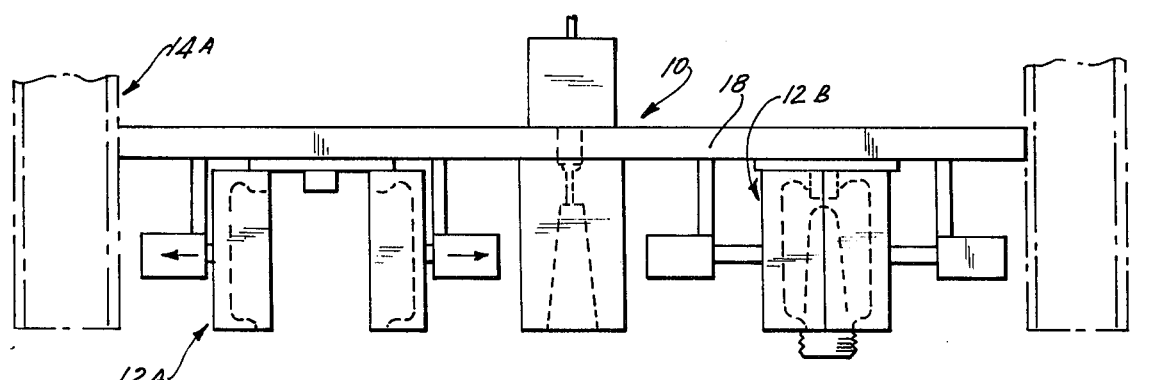
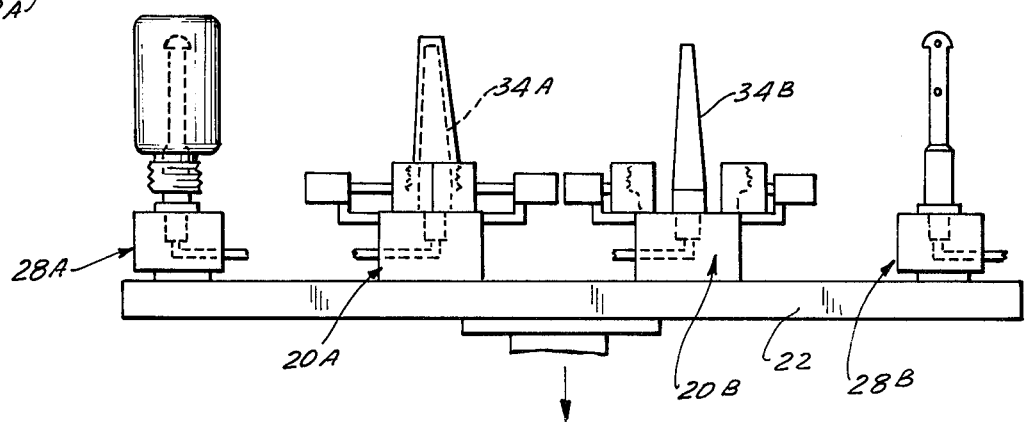
FIG. 4

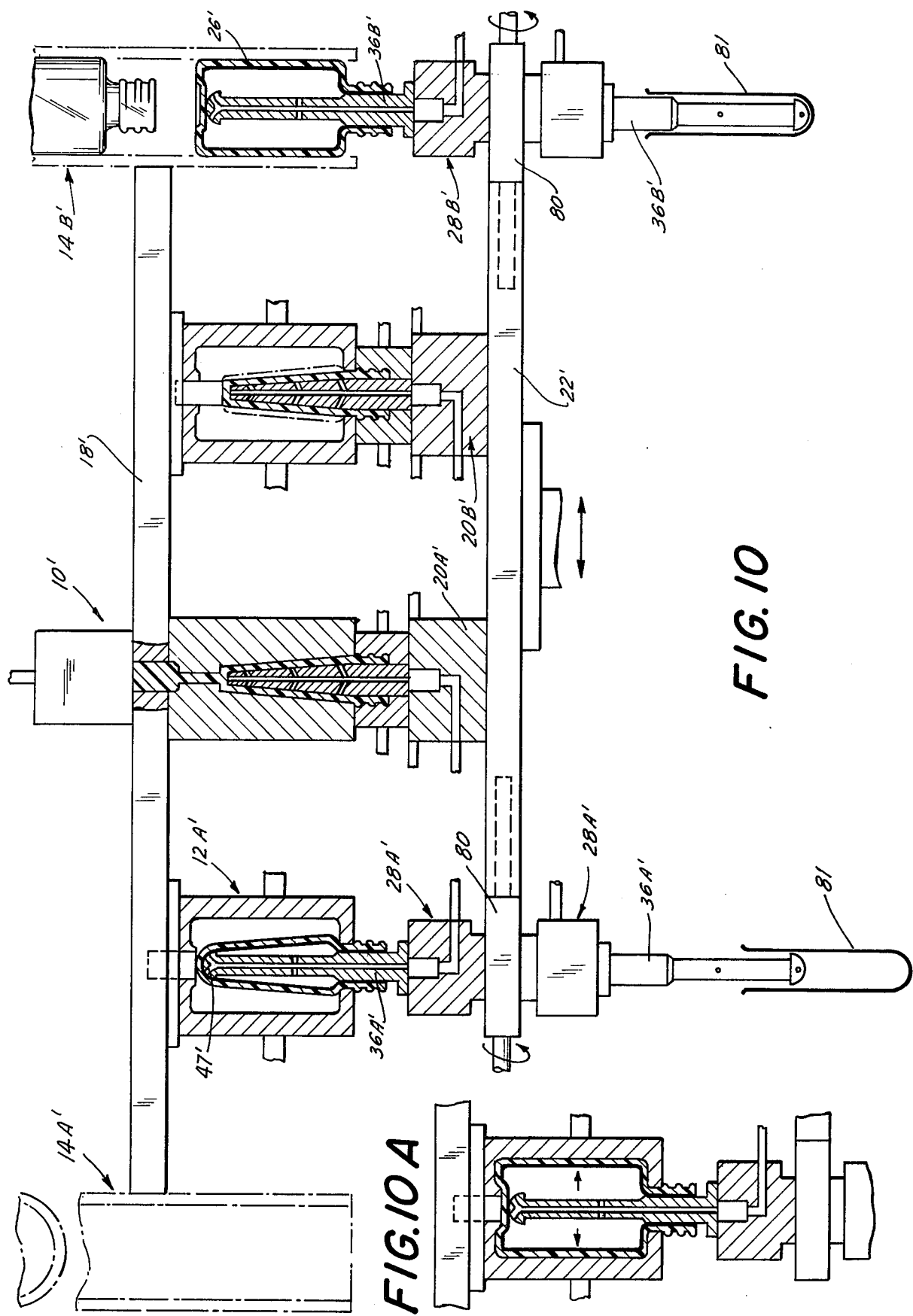

INJECTION BLOW MOLDING APPARATUS

REFERENCE TO RELATED APPLICATIONS

This application is a continuation of application Ser. No. 551,274 filed Feb. 20, 1975, now abandoned, and is a continuation-in-part of application Ser. No. 558,819 filed Mar. 16, 1975 now U.S. Pat. No. 3,990,826 granted Nov. 9, 1976 which is a continuation of Ser. No. 318,703 filed Dec. 27, 1973, now abandoned, which in turn is a division of Ser. No. 158,161 filed June 30, 1971, now U.S. Pat. No. 3,776,991 granted Dec. 4, 1973 and which in turn is related to application Ser. No. 285,244, filed May 31, 1972 now U.S. Pat. No. 3,819,314 granted June 25, 1974.

SUMMARY OF THE INVENTION

The present invention relates to a method and apparatus for making hollow plastic articles such as containers or bottles by first injection molding a preform or parison, bringing the temperature to an orientation range, transferring it to a blow molding station at which time the parison is initially removed from the transfer pin. The parison is retained in position at the blow molding station for insertion of a core pin which axially extends and stretches the parison fully in one direction and then permits air to blow the parison to the desired extent within the mold in another direction to form the configuration of the finished blown article. The article is then cooled and is transferred to an ejection station for removal from the apparatus or to a further work station.

The technique employed includes the steps of injection molding, axial expansion by stretching and then blow molding to obtain biaxial orientation of the finished product, article cooling and article ejection which are separate and related to one another but adapted to operate simultaneously.

The apparatus and technique permits the injection molding of a parison and then transfer to a further station for first longitudinal expansion by stretching and then lateral expansion by blow molding to a finished configuration. The finished product is then transferred to an ejection station for removal.

A further object is to provide a multiple station injection blow molding apparatus and method in which two sets of core rod assemblies index at prescribed stations sequentially, with the first set cooperating in injection molding a parison and the second set axially expanding the parison to its full extent, blow molding the parison laterally to the selected full configuration, cooling the blown article and thereafter transferring the article to an ejection station or a further work station.

A further object is to provide a transfer injection blow molding machine and method of employing close temperature controls for both heating and cooling where required to obtain parison molding to the desired configuration together with biaxial orientation.

Still a further object is to provide a transfer injection blow molding machine and method employing two parison blowing stations being fed alternately from one injection station together with two article ejection stations for removing the finished articles and transferring them to a desired location.

Another object is to provide a method and apparatus for bringing different plastic resins to the proper temperature range in order to cause molecular orientation and a method and apparatus to support the parison while it is being axially expanded.

Another object is to provide a multiple station blow molding apparatus and method in which two sets of core rod assemblies index at prescribed stations sequentially with the first set cooperating in injection molding a parison and then effecting separation therefrom in order that the parison may be left at the molding cavity, and the second set fitted with a liner for insertion into the parison of the molding station, cooperating in molding the parison and liner together into the final product configuration with the liner interiorly of the plastic parison shell, and thereafter removing the finished product from the blow molding station and transferring it to an ejection station or a further work station.

A further object is to provide adjustable stop means to regulate the axially stretching capacity of the parison during the molding process and thereby further control molecular orientation of the parison.

Other objects and advantages will become apparent from the following detailed description which is to be taken in conjunction with the accompanying drawings illustrating somewhat preferred embodiments of the invention.

BRIEF DESCRIPTION OF THE DRAWINGS

In the drawings:

FIG. 1 is a top plan view of an injection blow molding apparatus of this invention showing the press in a closed or clamped position;

FIG. 2 is a similar top plan view of the press opened;

FIG. 3 is a similar plan view with the press closed after the core rod assembly supporting plate shifted linearly to the right to transfer a parison and cooled finished article to the blowing and ejection stations, respectively, and the two remaining core rod assemblies being transferred to cooperate in blow-cooling and parison injecting, respectively;

FIG. 4 is a similar plan view with the press opened following the step of FIG. 3 after which the apparatus assumes the disposition shown in FIG. 1;

FIG. 5a is a fragmentary sectional view of the left hand blow mold after the parison has been laterally blown to the full extent subsequent to the stretching of FIG. 5;

FIG. 10 is a sectional view of the alternative embodiment as shown in FIG. 8 immediately after the press has been closed and the parison in the left blow mold has been axially stretched with the liner inserted therein; and FIG. 10A is a fragmentary sectional view of the left blow mold of FIG. 9 with the parison and inserted liner having been expanded fully laterally to arrive at the final finished product configuration.

DESCRIPTION OF THE PREFERRED EMBODIMENTS

Figure 5:
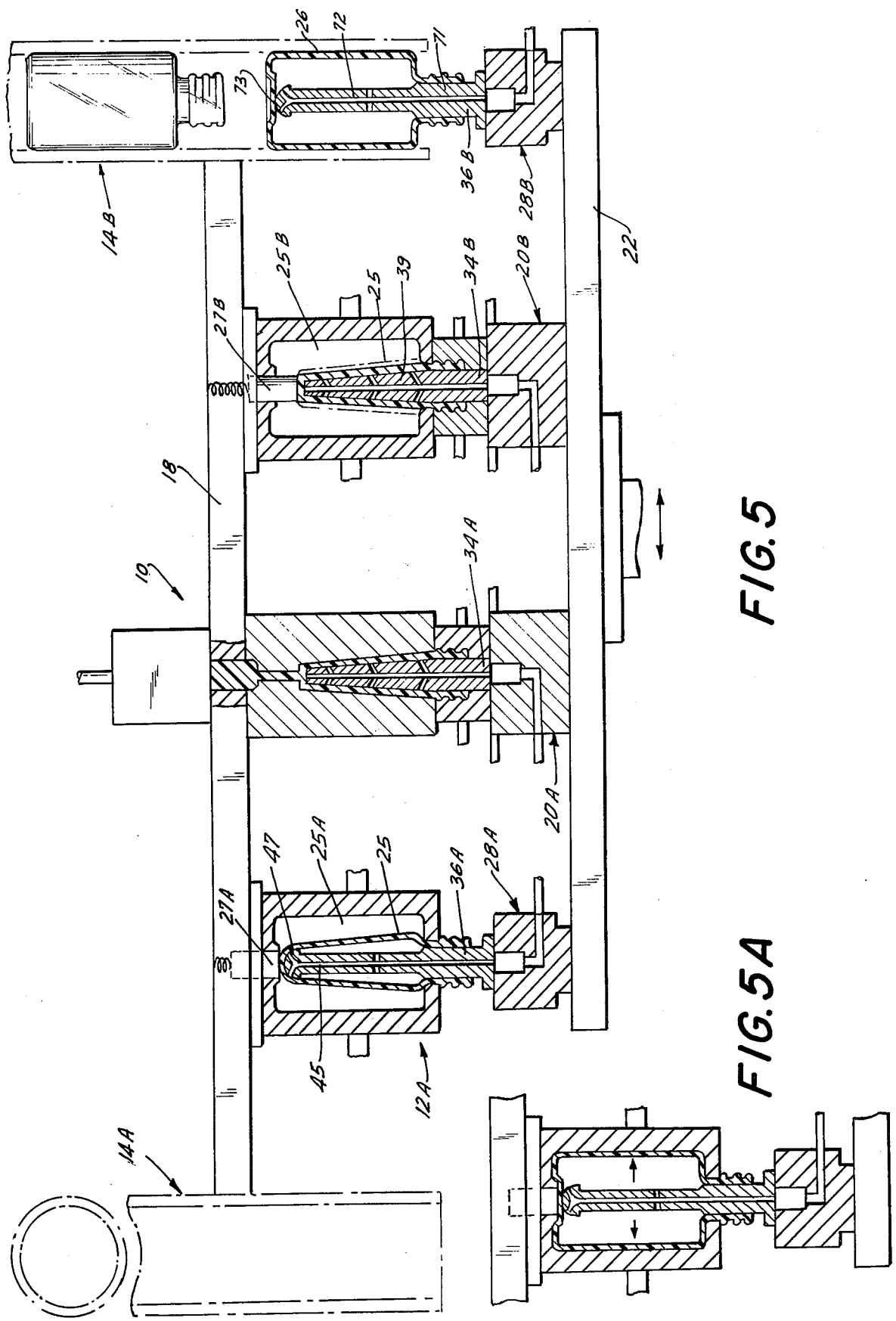
FIG. 5 is a sectional view with the press having been just closed after the core rod assembly supporting plate has been shifted linearly to the right and the parison in the left blow mold has been stretched to the full axial extent.
Figure 6:
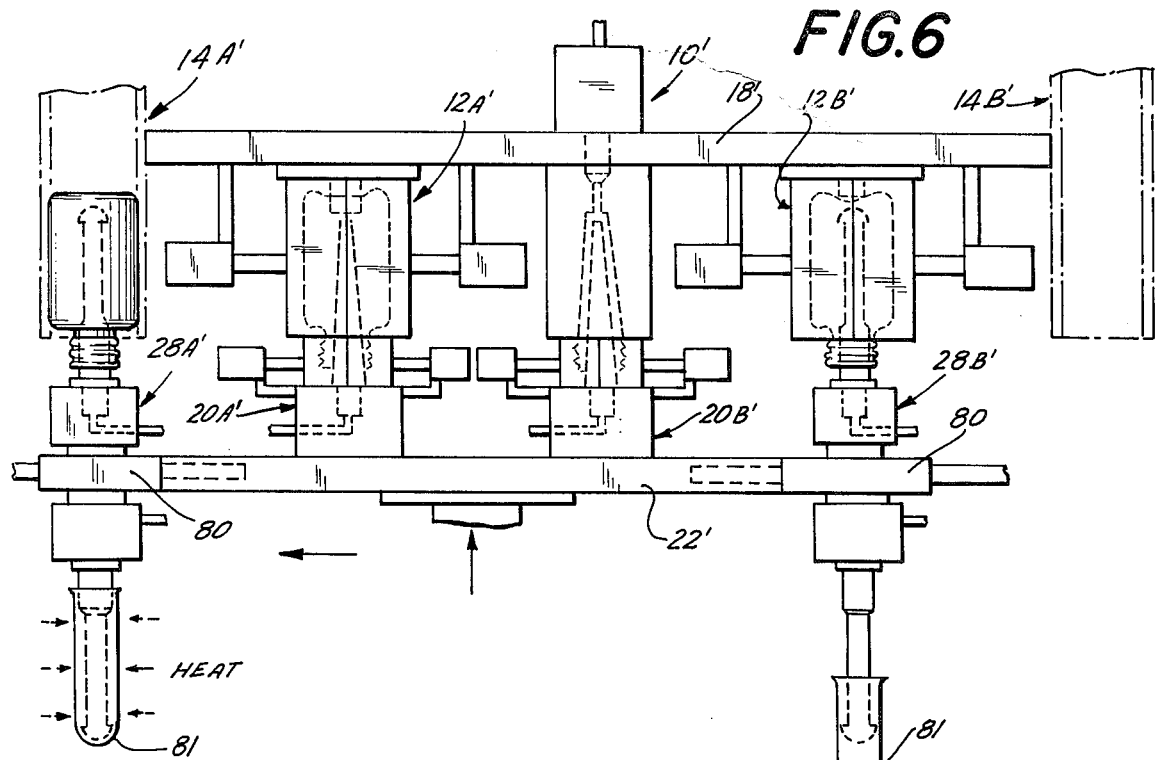
FIG. 6 is a top plan view of an alternative form of an injection blow molding apparatus of this invention showing the press in a closed or clamped position.
Figure 7:
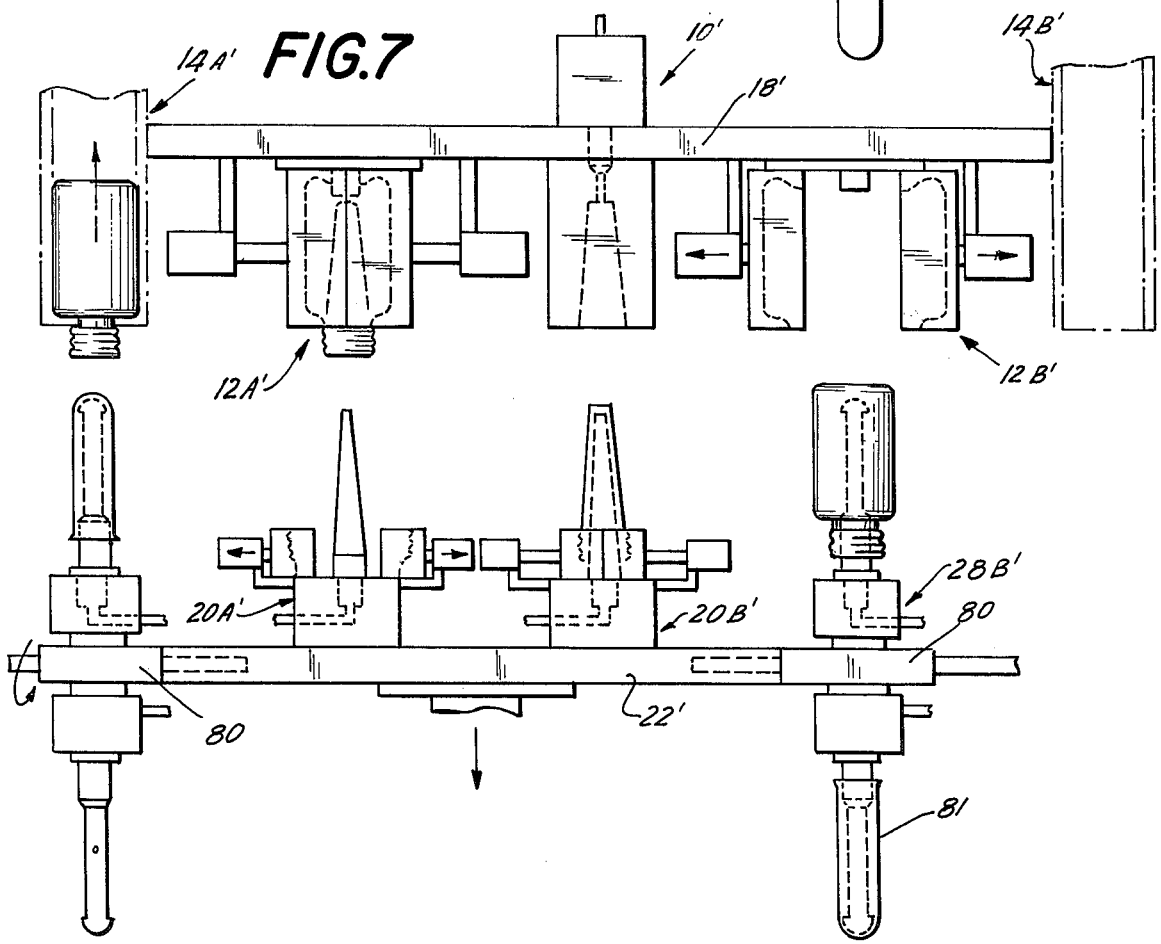
FIG. 7 is a top plan view of the press opened.
Figure 8:
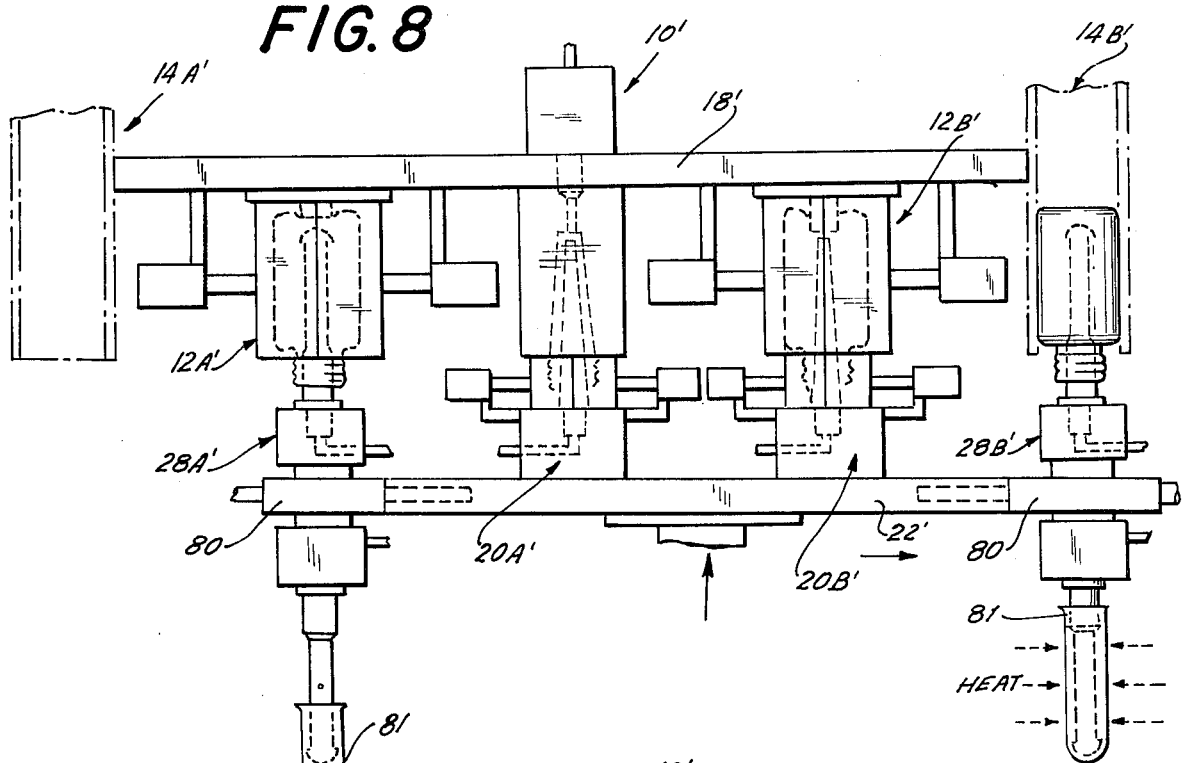
FIG. 8 is a similar plan view of the alternative embodiment with the press closed after the core rod assembly supporting plate shifted linearly to the right to transfer a parison and cooled finished article to the blowing and ejection stations, respectively, and the two remaining core rod assemblies being transferred to cooperate in blow cooling and parison injecting, respectively, and the two remaining core rod assemblies being transferred to cooperate in liner insertion, blow cooling and parison injecting, respectively.
Figure 9:
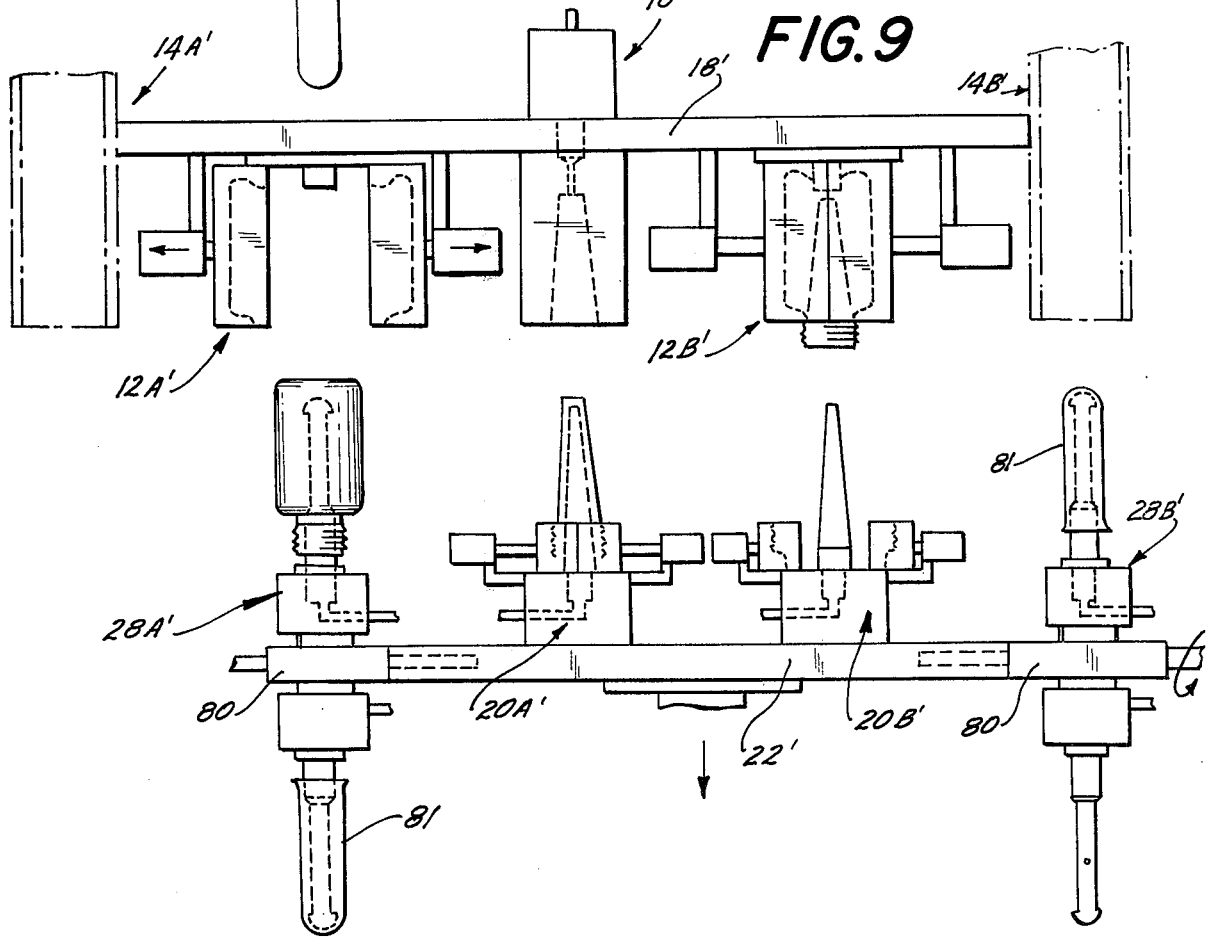
FIG. 9 is a similar plan view of the alternative embodiment with the press open following the step of FIG. 8.

Referring initially to the embodiment of injection blow molding machine illustrated in FIGS. 1–5A, a single row of in-line stations are present, namely a preform or parison injection station 10, a pair of blow molding stations 12A and 12B on opposite sides of the parison injection station 10 and a pair of ejection stations 14A and 14B spaced outwardly from stations 12A and 12B, respectively. At the parison injection station 10, a parison mold 16 mounted on clamping plate 18 cooperates alternately or sequentially with a pair of core rod assemblies 20A and 20B mounted on plate 22 in forming the parison 24.

These core rod assemblies 20A and 20B are also adapted to couple with the blow molds 12A and 12B, respectively, in transferring the parisons 24 to the blow molds for formation of receptacles 26. The parisons 24 are displaced from rod assemblies 20A and 20B by a partial expansion thereof from air passed through rods 20A and 20B. Alternatively, the parisons can be displaced by the readily available means such as collapsing the core pin, pulling the parison off the core pin, or by providing the core pin with a lubricant surface. The partially expanded parison 24 as shown in FIG. 2 is then retained in the molds 12A and 12B until coupled with core rod assemblies 28A and 28B which are arranged in line with and on opposite sides of the core rod assemblies 20A and 20B. The parisons are first axially expanded by stretching during the insertion of core rods 28A and 28B as depicted in FIG. 5 and then laterally blown into final configuration by air passing through rods 28A and 28B as depicted in FIG. 5A. The formed final receptacle 26 is then permitted to cool in the molds 12A and 12B and are transferred from the blow mold station to the ejection station at which a product removal mechanism 30A and 30B cooperates in removing the finished receptacle from the accommodating core rod assembly 28A and 28B, respectively. Although a single row of stations are illustrated in the drawings, it should be understood that multiple rows of such stations may be on the plates 18 and 22 not only in a horizontally disposed line as illustrated, but vertical as well or in parallel lines; and similarly, the plates 18 and 22 could be horizontally disposed rather than being vertical as shown where desired or necessary. A rotary arrangement could also be employed. In the illustrated embodiment of FIGS. 1 to 5A, clamping plate 18 is stationary whereas indexing plate 22 is reciprocal towards and away from plate 18 and is reciprocal in a plane parallel to the plane of plate 18. Mechanism for accomplishing this reciprocation is well known to the art and for this reason will neither be described nor illustrated. Obviously, clamping plate 18 may be reciprocal and plate 22 stationary or these plates may traverse any one or the other of the reciprocal movements.

Injection Station

The core rod assemblies 20A and 20B when aligned with the parison injection mold 16 form the injection station. In each cycle, one of the core rod assemblies is disposed within the cavity of the mold 16 for purposes of receiving the injected plastic shot employed in molding the parison 24. The core rod assemblies 20A and 20B may be essentially of the type disclosed in the above referenced patents and may have associated therewith a one-piece or split neck mold 32A or 32B respectively. These neck molds will remain in a closed position except at such time as it is desired to disassociate the core assembly 20A or 20B from the partially expanded parison 24 so that the free core assembly may be in a position to return to the parison injection station 10 to form another parison 24. In this instance, the core rod assemblies 20A and 20B include the core rod 34A and 34B which cooperates with the parison injection mold 16 and neck molds 32A and 32B in defining the shape of the parison 24. For certain types of containers a one-piece neck mold could be employed. The choice of neck mold depends on the size and shape of containers being formed.

Upon reciprocation of the indexing plate 22 and assuming the relative position of reciprocation as shown in FIG. 1, the parison mold 16 will be disposed about the core pin 32B into engagement with the closed neck mold 32B to define the parison forming cavity. The parison 24 is formed upon the injection into the cavity of the selected plastic melt under controlled pressure and temperature with uniform density as explained in the above patents.

The mold 16 and particularly its cavity is carefully temperature controlled, electrically or by fluid (water or oil), in a manner well known to the art. In this connection, the mold 16 is at elevated temperatures whereas the split mold 32B is cooled to set the configuration of the neck as early as possible in the molding process. Core pin 34B is also heated either by means of liquid or electrical heat. If desired, the core pin could be cooled by the same means. In this manner, a skin is formed on the outer surfaces of the parison 24 and on the inner surfaces thereof whereby the parison 24 is correctly "seasoned" in the parison mold 16 for blowing. For such purposes, the indexing plate 22 is retracted to the position shown in FIG. 2. Thereafter, the plate 18 reciprocates to the right to assume the relative disposition as illustrated in FIG. 3 prior to the forward reciprocation of plate 22.

A standard parison cavity 16 for a range of bottle sizes and weights is employed with an exchangeable temperature controlled core pin 34B and an exchangeable temperature controlled neck mold 32B. With these elements in the clamped injection position, a parison preform of resin 24 is injected under controlled pressure and temperature conditions. Upon completion of the injection, the plastic resin is brought to orientation temperature range by temperature control devices in the injection cavity and the core pin. Whether heating or cooling is required depends on the type of plastic material being molded. As stated above, the neck ring is cooled rapidly to make the preformed neck cool and set up.

Blow-Orient Station

The indexing plate 22 will reciprocate forwardly towards plate 18 to place the blow mold 12B about the parison 24 on core rod 34B and into engagement with the closed neck mold 32B as shown in FIG. 3 prior to blowing. During this procedure, the parison is still undergoing temperature change preparing for orientation and stops 27A and B restrain the parison from further movement at this time and may assist in temperature control. The neck ring continues to cool the plastic parison neck and the temperature control device within the mold 25B and in core pin 34B brings the parison to orientation range. Cool or warm air might be used on the outside of the parison entering from appropriate vents in the mold cavity. The ultimate object is to bring the parison to proper orientation temperature. A stop 27A and 27B which is spring loaded touches the end of the parison 24 or alternatively is about 1/16 inch in from the parison end. This stop 27A and 27B is temperature controlled also. Low pressure air is momentarily introduced or puffed into parison 24 to bring it into the configuration 25 as depicted in FIG. 5. The air can enter the parison in a conventional fashion such as through air vents 39 in core pin 34B. In this manner, the plastic parison is slightly expanded off of core pin 34B and the air pushes the parison 24 against the stop 27B, just enough so that the core pin 34B may be withdrawn. By that time, the neck ring has cooled and the mold opens.

Indexing plate 22 withdraws removing the core pin 34B while leaving the partially expanded parison 25 in the blow cavity 25B. It is held in place by the interengagement between the partially enlarged parison 25 and the bottom wall of the mold cavity and by interengaging surfaces between the parison neck and the mold cavity. Alternatively, the pin can be removed by collapsing it and withdrawing it from the parison, by coating the surface of the pin with a lubricant, by pulling the parison from the pin from within the mold, or any other readily available means.

The core system then transfers linearly again until the appropriate core assembly 28B is brought into alignment with mold cavity 25B. The resultant position would be the same as that depicted for core pin 28A with respect to mold cavity 28A in FIG. 5.

This secondary core pin assembly 28A includes a nylon or similar material pick-off pin 36A which is lined up with the partially expanded parison 25. Indexing plate 22 then closes extending core pin 36A into mold cavity 28A and into the partially expanded parison 25. As the assembly closes, pin 36A stretches the parison 25 longitudinally from the inside while the stop 27A supports the outside of parison 25. Since the parison is at the proper temperature range, the stretching orients the parison molecules. It also stretches the parison to the proper length as predetermined by stop 27A to obtain the desired amount of orientation in one direction and to permit uniform stretching of the parison side walls.

The stop 27A is then forced back into its blowing position. Stop 27A can be mounted in any convenient fashion for adjustment purposes such as by use of springs. When the mold 12A is totally closed and the parison is fully stretched, high pressure air enters the parison from the central shaft 45 and connecting apertures 47 in pin 36A. This high pressure air or other gas expands the parison to the finished container shape 26 as depicted in FIG. 5A. The container takes the shape of the blow cavity 25A.

Since the parison does not expand much further longitudinally, having already done so, but does radially, it now orients again at right angle to the previous orientation. The container cools and is then biaxially oriented. The result is an increase in impact strength, tensile strength, and stiffness. Additionally, the biaxial orientation decreases gas permeation factors as well.

By use of interchangeable or adjustable molds, different size and shape containers can be formed. Only a single injection cavity need be employed.

When bar 22 retracts, after the mold clamp has opened, the container 26 is extracted from the blow cavity 25A by engagement with retracting pin 36A.

In the embodiment of FIGS. 1-5A the pin 36A or 36B then linearly transverse into alignment with the ejection chute 14A or 14B as may be appropriate. However, alternatively, pin 36 can be aligned with further work stations, for example, the container can be aligned with an oxidizing flame, it can be put into position for decoration, it can rotate the container against a printing roll or coating roll or into alignment with a coating spray. Furthermore, it can support the bottle while it is labeled or it can be positioned so that the bottle can be filled with a product. These additional steps are enabled by the nature of pin 36A which is fully extended into container 26 and fully controls movement of the container. The pin 36A or 36B has an enlarged bottom end 71 which frictionally fits with the neck portion of the container and it has an intermediate narrower portion 72 which extends the remaining depth of the container 26 and terminates in a knob 73 which bottoms against the inner bottom surface of container 26. Knob 73 forms the surface which longitudinally extends the container initially as described above. By use of a pin or rod such as 36A and 36B the container can be fully handled and controlled for the descriptive purposes as outlined above. For every additional work station a set of additional pick-off pins would be provided with the ultimate set directing the forwarded product to the ejection station.

An alternative form of the apparatus is depicted in FIGS. 6-10A. All of the similar parts are similarly labeled with the addition of a prime added thereto. The difference of note between the embodiment of FIGS. 6-10A and the embodiment described above is in the provision of rotatably mounted core pins 36A' and 36B'. Instead of a single core pin assembly 28A or 28B there are opposing core pin assemblies 28A' and 28B' which are approximately 180° apart and are mounted on a rotatable cylinder member 80 which is driven by conventional means about bar 22' as indicated by the arrows in FIG. 10. Means for rotating the opposing core members is any conventional well known means which is adaptable for use with the conventional drive mechanisms employed for the linear motion. As shown in FIG. 10, when one core pin 36B' is in position for ejecting a container 26 the opposing core pin 36B' has a liner applied thereto in a conventional fashion. The liner or sleeve 81 is retained on the pin 36A' or 36B' until it is in position to be rotated for alignment with a mold cavity. In this fashion, the liner is inserted with the core pin 36B into the partially expanded parison 25 and in the following molding process is welded or joined in some other convenient fashion with the plastic material as a unitary final container with liner 26'. If desired, the liner may be preheated prior to insertion.

The opposing pins 36A' and 36B' can pick up the liner material either during the ejection phase of operation or just prior to rotation and insertion into the mold cavity. The liner 81 can be in the form of a sleeve as depicted or it can be an applied film, thin walled tube or cup or the like. The material for cup or liner 81 can be of a more expensive nature and designed for its barrier and inert features. When used, a more inexpensive plastic outer shell can be employed thereby providing a container for use in unusual situations where deterioration may occur without the necessity of having the entire container of the more expensive or difficult to obtain plastic.

The inner liner or barrier plastic cup can be heated or softened prior to insertion by conventional heating means either part of pins 36A' and 36B' or conventional heat is located in the vicinity of the liners when they are mounted.

With the bar 22' retracted from bar 18, the pins 36A' and 36B' can be rotated freely to bring the pin containing the liner into alignment with the appropriate mold cavity. Thereafter, bar 22' closes with bar 18' and the pin and liner combination enters the parison in the partially expanded parison 25 in the blow cavity. The pin 36A and 36B stretches the parison and at the same time the liner 81 welds to the inside end of parison 25. Thereafter, high pressure air entering through orifices 47' in the pin 36A or 36B expands the liner 81 and the parison 25 to take the form of the blow cavity. During this process, the liner welds or joins to the parison 25 and the result is a finished container 26' with an inner liner 81 and an outer shell parison of a dissimilar plastic.

Alternative arrangements can be employed for the opposing sets of pins. For example, they can be horizontal reciprocal pairs or in any other convenient rotary or linear relationship to be shifted between the liner receiving position and the in-line position for the molding process.

In all of the embodiments discussed, when the final container shape 26 is formed, a constant stream of air passes through orifices 47 in the pins 36A and 36B at reduced pressure and is passed over the inner surfaces of the receptacles 26. This air is permitted to bleed out between the receptacle neck and the core pin 36A or 36B. This type of cooling action facilitates faster injection blow molding, however, obviously there are several other ways of obtaining this constant air flow and circulation for cooling the receptacle 26, all of which are intended to be embraced by the present invention.

Returning to consideration of the ejection station as depicted in respect to the embodiment of FIGS. 1–5A, upon lateral reciprocation of plate 22, the core rod 36A or 36B with the associated cooled receptacle 26 thereon is brought into alignment with the appropriate product removal mechanism 30A and 30B respectively. When the indexing plate 22 is shifted forwardly, the cooled receptacle 26 is placed into association with the product removal means 30A or 30B which, in the illustrated embodiment, may assume the form of a suction tube which will withdraw the receptacle from the core rod. In this connection, each cycle, one set of the core rods will deposit the receptacles in the ejection tubes while the other set are coupled with the blow mold as the case may be for final formation and cooling of the blown receptacles 26. The receptacles can be removed in any conventional fashion such as those disclosed in the above referenced patents.

It should be kept in mind that for each linear arrangement employed with appropriate ejection tubes at the end, there is a separate chute. Therefore, if different size containers are being formed at different successive linear arrangements, the chutes will automatically index each size container at their outlet point. In this manner, there is no intermingling of different size resultant containers and the products are automatically categorized. As previously discussed, other work station operations can be performed at the location of the ejection station.

To briefly summarize the general operation of the present system as present in the embodiments depicted, plastic resin is initially injected into the cavity of the parison mold 16 and split neck mold 32B at the parison molding station 10 to form a parison 24. The press opens by the retraction of indexing plate 22 permitting the core rod assembly 20B to remove the parison from the mold in a manner as shown in FIG. 2. The linear transfer mechanism is then actuated to cause the plate 22 to shift laterally to align core 34B with the cavity of the blow mold 25B at the blow molding station 12B. The press closes once again and air enters the parison 24 and forces the plastic away from the core pin into a partially expanded condition. Once this has occurred, and the neck of the parison has cooled, the neck mold opens and the press opens leaving the partially expanded parison 25 in the blow mold cavity for further cooling and expansion as the press is opened in a manner shown in FIG. 4. The plate 22 is reciprocated to its other lateral position to align the core rod assembly 28B or in the case of the second embodiment 28B' with the blow mold 25B or 25B', respectively, containing the partially expanded parison 25. Thereafter, if the embodiment of FIGS. 6–10A is employed, the pins 28B' are rotated so that the pin containing the liner which has been applied to the pin sometime previously while it was in the opposing position is rotated to be brought into alignment for insertion into the mold 25B. At that time, the process for either embodiment is the same as the press is closed and the core rod 36B or 36B' enters the neck of the partially expanded parison 25. As the press closes, the knob 73 at its end engages with the bottom of the parison 25 and stretches the parison longitudinally thereby orienting the molecules of the parison in that direction. This action continues until the parison bottoms against stop 27B which determines the length required for desired orientation in one direction. Air is then blown through the apertures 47 in the core rod to expand the parison 25 laterally and orient the molecules of the parison in that second direction. The parison takes the form of the entire mold cavity with the piston 47 being retracted to the base of the mold cavity. In the case of the embodiment employing the liner, the stretching and blowing procedure causes the liner to weld or join to the inner surface of the parison 25. In any event the resultant container 26 is of the desired configuration. Air is then blown through the orifices 47 in the core pin to cool the container.

At the end of the cool cycle, the blow mold cavities open at blow molding station 26B. The press is once again opened and the cooled receptacle 26 is then transferred by the core pin to the ejection molded station 14B. Thus, during each cycle parisons are injection, parisons are partially blown, parisons are stretched and blown and biaxially oriented into final container forms and thereafter cooled. The finished containers are ejected or alternatively as discussed above can be passed to further work stations for desirable activity.

The economic advantages of containers formed by the above apparatus and procedures are readily apparent. By using replaceable or adjustable mold cavities, the initial injection cavity can be of a somewhat uniform size thereby greatly reducing change-over time and providing for longer life for the molds. Additionally, by biaxially orienting the containers, they have greater strength and less gas permeation with the use of less plastic. Naturally, this reduces the cost. The overall time cycles of the operations can be accomplished in much faster time and production is increased. When the embodiment employing the liner is utilized, a cheaper plastic shell can be employed thereby reducing the overall cost of the container.

Thus the several aforenoted objects and advantages are most effectively attained. Although somewhat preferred embodiments have been disclosed and described in detail herein, it should be understood that this invention is in no sense limited thereby and its scope is to be determined by that of the appended claims.

I claim:

1. An ejection blow molding apparatus for making plastic receptacles comprising:
an injection station, including means at the injection station injection molding a parison of selected configuration;
an expansion and blowing station including means to position the parison and then to expand the parison to a predetermined length and then to blow mold the parison into a predetermined lateral and final configuration;
an ejection station with product removing means at the ejection station removing the finished product from the apparatus;
the injection station, expansion and blowing station, and ejection station being positioned in an adjacent linear side-by-side cooperating arrangement;
a linear transfer means being reciproally movable toward and away from the injection station, expansion, and blowing station, and ejection station and being reciprocally movable in a path perpendicular to the direction of reciprocal movement toward and away from the stations;
the linear transfer means being positioned with respect to the injection station, expansion and blowing station, and ejection station so that movement thereof away from the stations will permit the linear transfer means to remove a parison from the injection station along a first path and to simultaneously remove a finished product along a second path parallel to the first path and then along a third path perpendicular to the first and second paths to bring the parison into alignment with the expansion and blowing station and the finished product into alignment with the ejection station and then transfer the parison along a fourth path into the expansion and blowing station and simultaneously the finished product along a fifth path parallel to the fourth path to the ejection station.

2. The invention in accordance with claim 1 wherein the means at the expansion and blowing station for expanding and blow molding the parison is sufficient to biaxially orient the molecular structure of the parison and the parison is maintained at proper orientation temperature during the molding thereof.

3. The invention in accordance with claim 1 wherein the apparatus includes one common injection station, two expansion and blowing stations with each station being positioned on one side of the injection station and two ejection stations with one of the ejection stations being located on the opposing side of a blowing and expansion station from the injection station.

4. The invention in accordance with claim 3 wherein a clamping plate and a second plate are provided, the parison molding means at the injection station including a parison mold mounted on said clamping plate, each of the blow molding means at the blowing stations including a blow mold mounted on the clamping plate in spaced relationship with a first blow mold on one side of the parison mold and a second blow mold being on the opposite side of the parison mold and in line therewith, the linear transfer means including first and second in line core rod assemblies respectively mounted on said second plate and each of said assemblies including a first core rod projecting laterally toward said clamping plate, each first core rod adapted to sequentially couple with the parison mold in molding a parison and thereafter transfer a molded parison to the blow mold furthest away from the other first core rod, a second core rod of one assembly being coupled with the first blow mold for blow molding the parison on said core rod when the first core rod of the one assembly is coupled with the parison mold for injection molding a parison and the second core rod of the other assembly being coupled with the second blow mold for blow molding the parison on said core rod when the first core rod of the other assembly is coupled with the parison mold for injection molding a parison.

5. The invention in accordance with claim 4 wherein the first and second core rod assemblies are adapted to permit removal of the core rod from the associated parison and means on the associated blow mold and parison to retain the partially expanded parison in position, each of the product removing means at the ejection station being mounted on the clamping plate with a first product removing means being on the side of the first blow mold away from the parison mold and the second product removing means being on the side of the second blow mold away from the parison mold, the product removing means being in line with the blow molds, the second core rods are for completing the expansion and blow molding of the parison into the finished product configuration and for cooling the blown parison in the blow molds and being mounted on said plate in line with the first core rods each second core rod adapted to coupled with the aligned blow mold when the respective first core rod is coupled with the parison mold and is adapted to first expand the parison axially and thereafter expand the parison to a full extend laterally to thereby biaxially orient the stretched plastic parison and each second core rod adapted to transfer the fully blown parison to the aligned respective product removal station when each respective first core rod is coupled with a blow mold.

6. The invention in accordance with claim 5 wherein means are provided for reciprocating the second clamping plate toward and away from the clamping plate to couple the core rods with the molds and means are provided for laterally reciprocating the second plate to cooperate in transferring parisons to the associated blow molding station and the blown parisons to the associated ejection station.

7. The invention in accordance with claim 1 wherein said injection station further includes a first core rod assembly and a second core rod assembly each having associated therewith a split neck mold for forming the neck of the container on the parison at the injection station, the neck mold being closed at the injection station and at the blow station and adapted to open prior to the uncoupling of the core rod assembly with the blow mold and thereafter close prior to coupling with the parison mold.

8. The invention in accordance with claim 7 wherein temperature control means are provided for controlling the temperature of the neck mold.

9. The invention in accordance with claim 4 wherein the parison blow molding means includes means for introducing air internally of the injection molded parison, the parison molding means being temperature controlled, each of the blow molds including a split mold which is closed and adapted to be opened when the second core rods transfer the blown parisons to the ejection stations.

10. The invention in accordance with claim 4 wherein the blow molds are temperature controlled and the second core rods are temperature controlled.

11. The invention in accordance with claim 4 wherein the second core rods include an enlarged knob on the forward end thereof and means for introducing air therethrough into the blown parison so that insertion of the second core rods into corresponding aligned partially expanded parisons will cause the parison to be stretched in the direction of movement of the core rod to the desired degree and then after when air passes through the core rod into the parison the parison will be fully expanded in the remaining lateral directions, and air bleed means to permit bleeding of the introduced air between the core rods and the blown parison.

12. The invention in accordance with claim 11 wherein an adjustable stop extends inwardly from the closed end wall to the blow mold to facilitate orientation of the parison by supporting the end of the parison holding it against the core rod to allow thereafter stretching of the parison side walls.

13. The invention in accordance with claim 1 wherein interchangeable and replaceable blow molds are employed at the expansion and blowing station to facilitate manufacture of different size finished products.

14. The invention in accordance with claim 1 wherein adjustable blow molds are employed at the expansion and blow molding station to facilitate manufacture of different size finished product.

15. The invention in accordance with claim 4 wherein the second core rod include a pair of core members which are mounted in respect to one another so that when one of the core members is in alignment with the clamping plate, the other core member is in alignment with means for applying an internal liner for a parison, and means for indexing the second plate so that a core member containing a liner is inserted into a blow mold when the core member is aligned therewith so that expansion of the parison causes simultaneous expansion and welding of the linear to the parison.

16. The invention in accordance with claim 1 wherein a removable chute is located at each ejection station so as to engage and guide the finished product to a predetermined location thereby facilitating the selected sorting of different size finished products for adjacent blow molding apparatus.

17. The invention in accordance with claim 4 wherein means are provided to linearly transfer second core rods and further core rods to further work stations with the finished parisons included thereon and in position for further work.

18. An ejection blow molding apparatus for making plastic receptacles comprising:
an injection station, including means at the injection station injection molding a parison of selected configuration;
an expansion and blowing station including means to position the parison and then to expand the parison to a predetermined length and then to blow mold the parison into a predetermined lateral and final configuration;
a work station with means associated therewith preforming further work on the full expanded parison;
the injection station, expansion and blowing station, and further work station being positioned in an adjacent linear side-by-side cooperating arrangement;
a linear transfer means being reciprocally movable toward and away from the injection station, expansion, and blowing station, and further work station and being reciprocally movable in a path perpendicular to the direction of reciprocal movement toward and away from the stations;
the linear transfer means being positioned with respect to the injection station, expansion and blowing station, and further work station so that movement thereof away from the stations will permit the linear transfer means to remove a parison from the injection station along a first path and to simultaneously remove a finished product along a second path parallel to the first path and then along a third path perpendicular to the first and second paths to bring the parison into alignment with the expansion and blowing station and the finished product into alignment with the further work station and then transfer the parison along a fourth path into the expansion and blowing station and simultaneously the finished product along a fifth path parallel to the fourth path to the further work station.

19. The invention in accordance with claim 18 wherein the means at said expansion and blowing station for expanding the parison to a predetermined length and then blow molding the parison into a predetermined lateral and final configuration acts sufficiently to biaxially orient the molecular structure of the parison, and the parison is maintained at proper orientation temperature during the molding thereof.

20. A single injection blow molding apparatus for making a selected oriented finished product comprising in combination:
a support structure;
an injection molding station on the support structure including injection molding means injection molding a parison into a selected configuration, said injection molding means including a first core rod assembly having a first core rod cooperating in forming the parison which is formed about the first core rod, said injection molding means including heating and/or cooling means including the first core heating and/or cooling the parison to orientation temperature while the parison is on the first core rod;
transfer means on the support structure transferring the parison to a blow molding station and removing the first core rod from the parison transferred to the blow molding station and returning the first core rod to the injection molding station;
a blow molding station on the support structure including blow molding means blow molding the parison while at orientation temperature into the configuration of the finished product, and blow molding means including a second core rod assembly having a second core rod cooperating in blowing the parison into the configuration of the finished product;
the transfer means on the support structure to assemble the second core rod with the parison at the blow molding station after the first core rod has been removed therefrom and disassemble the second core rod from the oriented finished product.

21. The invention in accordance with claim 20 wherein the conditioning means is operable to control the temperature of the parison while on the first core rod at the injection molding station and during the transfer thereof to the blow molding station to temperature condition the parison for orientation.

22. The invention in accordance with claim 20 wherein
an ejection station is on the support structure and includes ejection means for ejecting the oriented finished product from the machine.

23. The invention in accordance with claim 20 wherein the blow molding station includes expansion means including the second core rod for initially mechanically expanding longitudinally the parison and thereafter the blow molding means is operable to blow the longitudinally expanded parison into the configuration of the finished product whereby the molecular structure of the finished product is biaxially oriented.

24. The invention in accordance with claim 23 wherein the parison has a closed end and the expansion means includes a biased pin forming part of the blow molding means which cooperates with both core rods for supporting the closed end of the parison while at the blow molding station to prevent its rupture during orientation and blowing.

25. The invention in accordance with claim 20 wherein puffing means for supplying a puff of air while at the blow molding station to slightly expand the parison to facilitate the separation of the first core rod and its removal therefrom.

26. The invention in accordance with claim 20 wherein the blow molding means includes cooling means for rapidly cooling the blown finished product for retention of the finished product in its oriented configuration.

27. The invention in accordance with claim 20 wherein the transfer means operates to transfer the parison relative to the blow molding station along a first path of travel after it has been injection molded away from the injection molding station, then along a second path and then a third path to the blow molding station and operates to transfer the product from the blow molding station during the transfer of the parison.

28. The invention in accordance with claim 27 wherein transfer means operates to transfer the parison along a first linear path away from the injection station, then along a second linear path which is normal to said first path and then along a third path parallel to the first path to the blow molding station, and wherein an ejection station is on the support structure and transfer means simultaneously transfers the finished product from the blow molding station to the ejection station along corresponding paths.

29. The invention in accordance with claim 20 wherein finished product is a receptacle having a formed neck and neck mold means including the first core rod assembly at the injection molding station for forming the neck independent of the formation of the remainder of the parison and the neck mold means including cooling means to retain the neck configuration upon being molded.

30. The invention in accordance with claim 20 wherein adjustable means are at the blow molding station interiorly of the blow molding means for supporting the end of the parison by holding it against the second core rod during orientation and permitting the manufacture of different size products from a single size parison mold.

31. The invention in accordance with claim 20 wherein the second core rod assembly including means operable after the finished product is blown for cooling the product by circulating fluid interiorly of the finished product while at the blowing station.

32. The invention in accordance with claim 20 wherein a finished product removal station is on the support structure, the injection molding station, and blow molding station and removal station being in-line, and another blowing station and removal station being in-line with the injection molding station with another blow molding station adapted to receive parisons from the injection station.

33. A single injection blow molding apparatus for making a selected oriented finished product comprising in combination:
a support structure;
an injection molding station on the support structure including injection molding means injection molding a parison into a selected configuration, said injection molding means including a first core rod assembly having a first core rod cooperating in forming the parison which is formed about the first core rod;
conditioning means conditioning the parison to orientation temperature;
transfer means on the support structure removing the first core rod from the parison and transferring the parison to a blow molding station;
a blow molding station on the support structure including blow molding means blow molding the parison while at orientation temperature into the configuration of the finished product, the blow molding means including a second core rod assembly having a second core rod cooperating in blowing the parison into the configuration of the finished product;
the transfer means on the support structure assembles the second core rod with the parison at the blow molding station and disassembles it from the oriented finished product.

34. The invention in accordance with claim 33, wherein the conditioning means is operable to control the temperature of the parison during the transfer to the blow molding station to temperature condition the parison for orientation.

35. The invention in accordance with claim 34, wherein the blow molding station includes expansion means including the second core rod for initially mechanically expanding longitudinally the parison and thereafter the blow molding means is operable to blow the longitudinally expanded parison into the configuration of the finished product whereby the molecular structure of the finished product is biaxially oriented.

* * * * *